United States Patent Office 3,667,734
Patented June 6, 1972

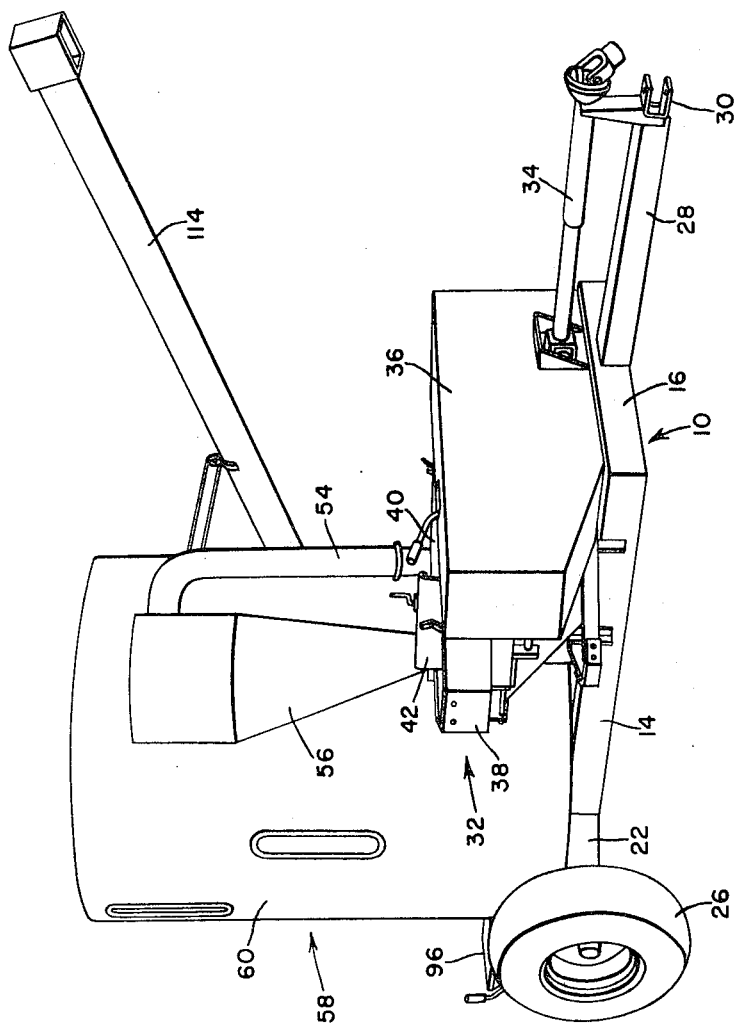

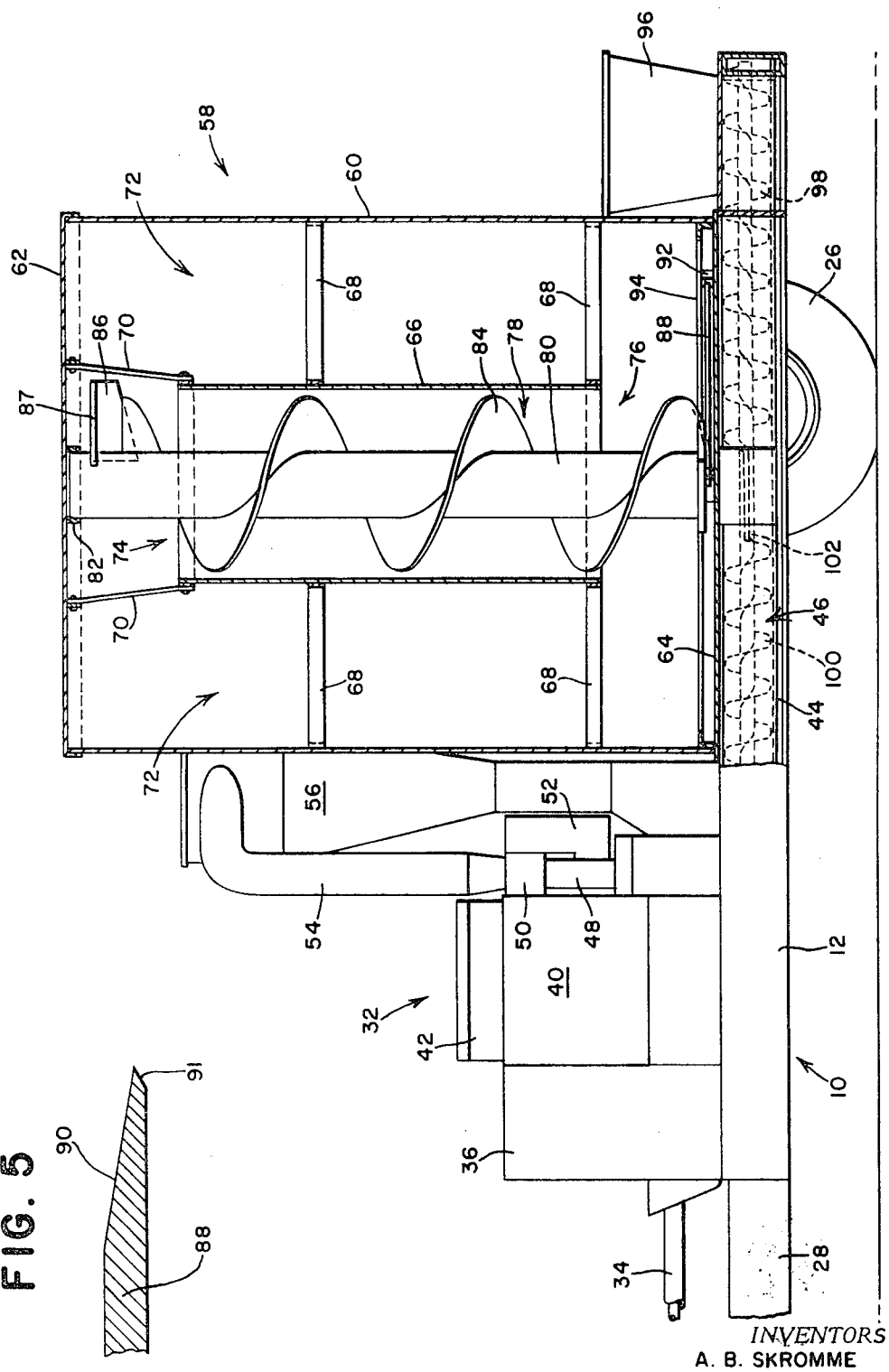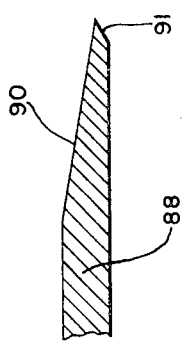

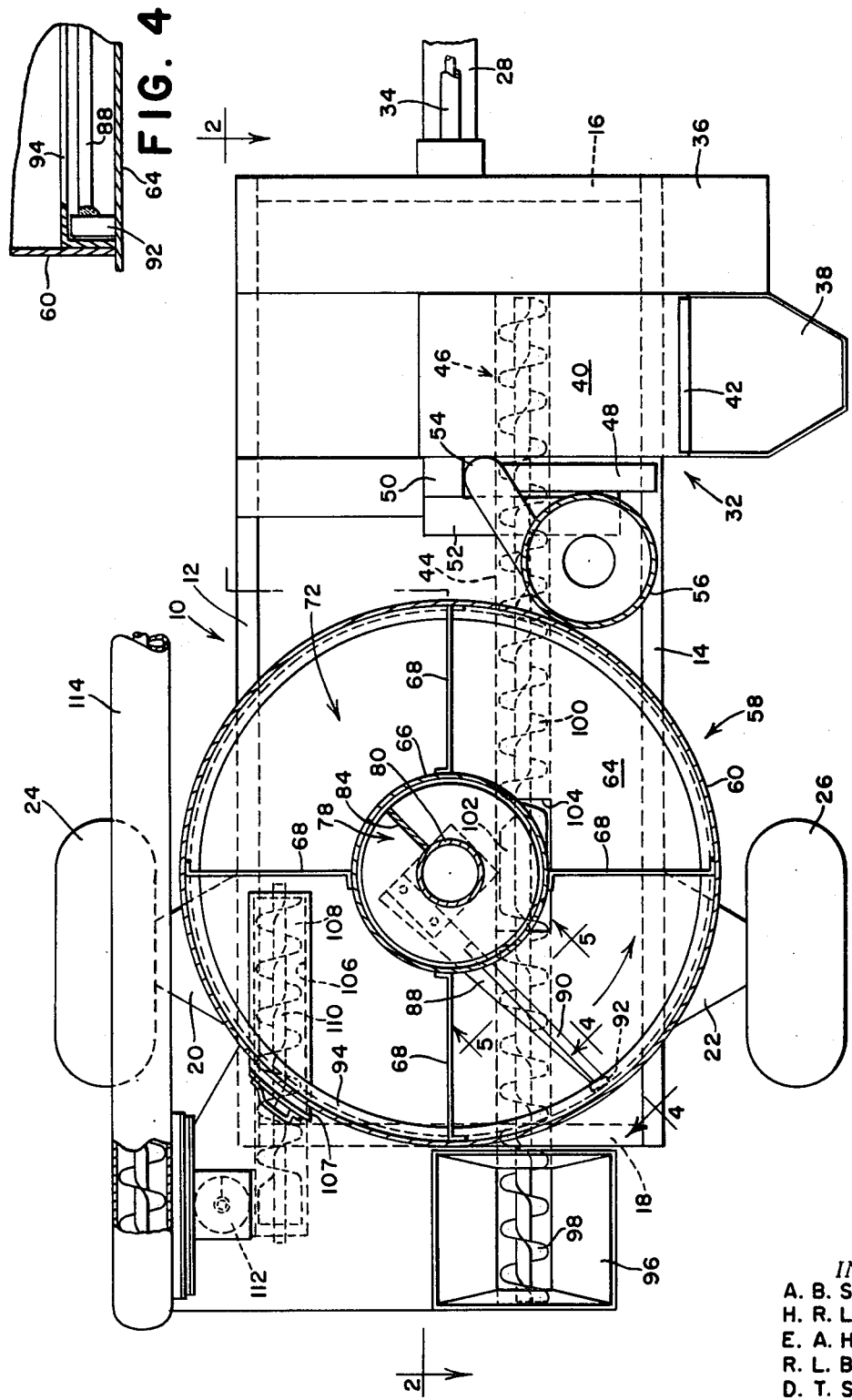

3,667,734
FEED-MIXING APPARATUS
Arnold Burton Skromme, Moline, Ill., Harold Richard Lindstrom, Des Moines, Iowa, Etlar August Henningsen, Geneseo, and Royal Lowell Beldin, East Moline, Ill., Donald Thomas Sorlie, Ankeny, Iowa, and Elmer Richard Eckert, Horicon, Wis., assignors to Deere & Company, Moline, Ill.
Filed Feb. 23, 1971, Ser. No. 118,050
Int. Cl. B01f 15/02
U.S. Cl. 259—44
22 Claims

ABSTRACT OF THE DISCLOSURE

Feed-mixing apparatus including a cylindrical tank having a substantially horizontal bottom, a mixing auger contained within a vertical tubular housing mounted concentrically within the tank, and a horizontal blade fixed at one end to the lower portion of the auger and having an outer end extending in close proximity to the tank wall, the blade being operable to sweep across the bottom of the tank as the auger is rotated and thereby promote mixing of the material contained therein.

BACKGROUND OF THE INVENTION

The present invention relates generally to a mixing apparatus, and more particularly to a mixing tank configuration and associated mechanism particularly suited for use in a portable feed grinder-mixer.

The mixing apparatus utilized in most commercially available combination feed grinding and mixing machines, of the type illustrated, for example, in U.S. Pat. 2,896,923 to Luscombe, issued July 28, 1959, conventionally comprises a vertical mixing tank with a cylindrical upper portion and a conical, downwardly converging lower portion, and a vertical mixing auger contained within a cylindrical tubular housing mounted concentrically within the tank. The auger housing is provided with an inlet opening adjacent the apex of the conical lower portion, and a discharge opening adjacent the top portion of the tank. During the mixing process, the auger operates to transport the material in the tank from the apex of the conical lower portion upwardly through the vertical housing, and discharge it into the cylindrical upper portion of the tank. As the material is removed from the lower portion of the tank by the auger, the material above settles gradually to the bottom of the tank and is again transported to the top. The lower portion of the tank wall converges downwardly to direct the material inwardly to the mixing auger inlet as it settles to replace that which has previously been elevated by the auger to the top of the tank. As the material is continuously circulated in this manner, the various ingredients thereof eventually become thoroughly intermixed.

Although such mixing apparatus is generally adequate, it is possessed of certain inherent shortcomings which render it not entirely satisfactory. The shortcomings stem primarily from the conical configuration of the lower tank portion, this shape being considered essential to assure a constant flow of material to the intake area of the vertical mixing auger. A common problem encountered in the operation of such conventional mixing apparatus, for example, is that of "bridging" of certain material as it settles in the conical portion of the tank. Since the horizontal cross-sectional area of that portion of the tank decreases as the walls converge inwardly, the material is compressed as it settles and, under certain conditions, forms a solid bridge between the tank wall and that portion of the auger housing which extends into the conical portion of the tank. Such a bridge of material prevents further settling of the material thereabove, eventually results in a void around the inlet area of the mixing auger, and thus halts the mixing process until corrective measures are taken. Another problem associated with such conventional mixing apparatus, when operating with certain other types of material, is that resulting from the tendency of that portion of the material adjacent the outer wall of the tank to remain relatively stationary while the material in the inner portion of the tank is circulated by the auger. The inner and outer portions of material thus fail to become properly intermixed.

Yet another problem inherent in such conventional mixing apparatus, when utilized on a pull-type portable grinder-mixer of the type disclosed in the Luscombe patent, is that of transport stability. A common procedure in the operation of such portable grinder-mixers is to grind and mix the various feed ingredients at one location, then transport the machine with the mixing tank full to one or more discharge locations. Due to the weight of the material in the tank and the high center of gravity thereof, the machine is somewhat unstable during transport. The high center of gravity results, again, from the conical configuration of the lower portion of the tank, since the primary volume of the tank is contained in the cylindrical upper portion. A related problem, or limitation, of the conventional apparatus is that of mixing tank volume. Since a minimum slope of the conical lower tank wall must be maintained to assure that all material is fed to the lower auger inlet, any desired increase in tank volume requires an increase in tank height. A height increase, in turn, raises the center of gravity of the material in the tank and thus further aggravates the transport stability problem.

SUMMARY OF THE INVENTION

It is, accordingly, the primary object of the present invention to provide a mixing apparatus possessed of none of the aforementioned problems of the prior art. More particularly, it is an object to provide a machine in which bridging of the material during the mixing process is prevented. It is a further object to provide a mixing tank having a much lower center of gravity than conventional tanks of equal volume. It is yet a further object to provide such a tank, the volume of which may be increased without increasing the height or center of gravity thereof.

In pursuance of these and other objects, the present invention comprises, generally, a substantially flat, rather than conical, bottomed mixing tank in the shape of a vertical, right circular cylinder, and a mixing auger operable within a vertical housing mounted concentrically within the tank. Since the walls of the tank do not converge, and since the walls of the housing are parallel with those of the tank, the material is not compressed as it settles toward the bottom of the tank, and thus no bridging occurs. The funcion of the conventional conical wall portion is assumed, in the invention, by a horizontal mixing blade or sweep connected to the lower end of the vertical auger for rotation therewith, the blade or sweep being operable during the mixing process to sweep across the floor or bottom of the tank and thus promote mixing of the material lying near its outer circumference. The blade includes a non-symmetrical sharpened leading edge which results in a substantial reduction in the drag forces acting on the blade as it rotates. When the blade passes beneath the material in the tank, the material is rapidly lifted and immediately allowed to settle. As the material is continually lifted and allowed to settle, it gradually shifts inwardly toward the lower end of the mixing auger, until it eventually is picked up by the auger and conveyed to the top of the tank. It has been found that the mixing job performed by the apparatus of the present invention is equal or superior to that performed by conventional conical apparatus.

Due to its flat bottom design, the volume of the mixing tank of the present invention is equally distributed throughout its vertical dimension, and the center of gravity of the material in the tank is thus much lower than would be the case in conventional conical-bottomed tanks of equal volume. In addition, a volume increase may be effected by merely increasing the diameter of the tank, without increasing the height thereof.

BRIEF DESCRIPTION OF THE DRAWINGS

The preferred embodiment of the present invention will be described in conjunction with the accompanying drawings in which:

FIG. 1 is a perspective view of a portable, combination grinder-mixer incorporating the mixing apparatus of the present invention;

FIG. 2 is a longitudinal sectional view of the machine taken substantially on the line 2—2 of FIG. 3;

FIG. 3 is a plan view of the machine with portions broken away to more clearly illustrate the invention;

FIG. 4 is an enlarged sectional view taken on the line 4—4 of FIG. 3; and,

FIG. 5 is an enlarged sectional view taken on the line 5—5 of FIG. 3.

DESCRIPTION OF THE PREFERRED EMBODIMENT

The mixing apparatus of the present invention is shown in the drawings as applied to a portable feed grinding and mixing machine, commonly termed a grinder-mixer, used for preparing livestock feed. The machine is supported by a frame structure 10 composed of right and left, longitudinally extending side rails 12 and 14, respectively, and fore-and-aft cross members 16 and 18, respectively. A pair of triangular brackets 20 and 22 extend outwardly from opposite sides of the rear portion of the frame 10 and rotatably support a pair of ground-engaging wheels 24 and 26, respectively, on their outer ends. A hitch member 28 extends forwardly from the central portion of the front cross member 16 and is provided at its forward end with a clevis 30 adapted for attachment to the drawbar of a tractor.

The grinding function of the grinder-mixer is performed by a conventional hammer mill 32 mounted forwardly on the frame. Power for operating the mill 32, as well as all other operating components on the machine, is transmitted from the power take-off shaft on the rear of the tractor through a drive shaft 34 extending longitudinally above the hitch 28, and conventional drive means, a portion of which is concealed by a removable shield 36. The material to be ground is deposited in a hopper 38 which communicates with the chamber 40 housing the rotor assembly (not shown) of the mill. A vertically adjustable gate 42 is provided between the hopper 38 and chamber 40 to control the flow of material into the chamber. The material in the chamber is reduced until small enough to pass through the holes in a screen (not shown) surrounding the rotor. Upon passing through the screen, the reduced material is collected in an auger trough 44 extending longitudinally beneath the mill, and is conveyed rearwardly to the mixing apparatus by an auger 46 operating therein. A suction fan 48 operates with the mill to effect a pressure drop through the screen of the mill. The air removed from the chamber 40 passes through ducts 50 and 52 to the inlet of the fan 48, and is discharged from the fan through a vertical tube 54 leading to a dust collector 56. The fine dust particles in the air are removed in the collector 56 and settle back into the auger trough 44 to be delivered with the remainder of the ground material to the mixing apparatus, while the clean air is discharged through an opening in the top of the collector.

The mixing apparatus of the invention includes a cylindrical tank 58 mounted on the rear portion of the frame 10 between the wheels 24 and 26, the tank comprising a vertical cylindrical wall 60 enclosed at its ends by circular, substantially flat top and bottom portions 62 and 64, respectively. A vertical tubular auger housing 66 is supported concentrically within the tank by a series of horizontal straps 68 extending between the walls of the housing and tank, respectively, and a series of upright straps 70 extending between the upper end of the housing and the top 62 of the tank. As shown in FIGS. 2 and 3, the walls of the housing 66 and tank 58 form the inner and outer walls, respectively, of an annular material mixing chamber 72. The ends of the auger housing 66 terminate short of the top and bottom of the tank 58 to provide upper and lower openings, 74 and 76, respectively, in the housing which communicate with the chamber 72. A large vertical mixing auger 78 is rotatably mounted within the housing 66 and is operable to receive material from the lower portion of the chamber 72 through the opening 76, advance it upwardly through the housing 66, and discharge it into the upper portion of the chamber 72 through the opening 74. The auger is driven from the power takeoff shaft on the tractor through conventional drive means (not shown). As the material is continually circulated through the tank, the various ingredients thereof become thoroughly intermixed.

The mixing auger 78 comprises a core tube 80 supported at its upper end in a bearing member 82, and spiral flighting 84 fixed along its inner edge to the tube 80. As shown in FIG. 2, the upper end of the auger is provided with a radially extending paddle 86 and a horizontal plate 87 joined along one edge to the paddle 86, the plate and paddle being operable to discharge the material outwardly into the upper portion of the chamber 72. Fixed to the lower end of the core tube 80 is a horizontal mixing blade or sweep 88 which lies parallel and adjacent to the tank bottom 64 and extends outwardly to the tank wall 60. The blade or sweep 88 sweeps across the bottom 64 as the auger rotates and acts to promote mixing of the material in the bottom portion of the chamber 72. The leading edge of the blade or sweep 88, as shown in FIG. 3, is parallel to but spaced rearwardly, relative to its direction of travel, from a line extending radially from the rotational axis of the auger 78. As shown in detail in FIG. 5, the blade or sweep 88 includes a non-symmetrical sharpened edge portion formed by the intersection of an upper inclined planar surface 90 and a lower inclined planar surface 91, the line of intersection of the surfaces 90 and 91 being offset downwardly from the vertical center of the blade. It has been found that the drag forces acting on the blade are at a minimum when the included angle between the surfaces 90 and 91 is in the range of thirty to fifty degrees. This angle is forty degrees in the embodiment illustrated in FIG. 5. As a result of the blade edge configuration, the material in the tank is rapidly lifted and immediately allowed to settle each time the blade or sweep 88 passes beneath it. As the material adjacent the wall 60 is continuously lifted and allowed to settle in this manner, it eventually shifts inwardly to the lower end of the auger 78 and is conveyed upwardly through the housing 66. If desired, the tank bottom 64 could be constructed with a slight inward slope, to speed the inward shifting of the material being mixed, without departing from the scope of the invention. Vertical movement of the outer end of the blade or sweep 88 is prevented by means of a block 92 fixed to its outer end and constrained from vertical movement by the bottom 64 of the tank and a horizontal flange or guide means 94 extending around the inner surface of the tank wall 60 just above the bottom 64.

In addition to the ingredients introduced into the tank through the hammer mill 32, additional ingredients can be added through a concentrate hopper 96 on the rear portion of the machine. The walls of the hopper 96 funnel downwardly and are joined to the rear portion of the longitudinal auger trough 44. As is apparent from FIG. 3, the flighting 98 on the rear section of the auger 46 is wound oppositely from the flighting 100 on the forward section. Upon rotation of the auger, the material reduced in the hammer mill is thus fed rearwardly through the trough 44 while the material deposited in the concentrate hopper is fed forwardly. At the juncture of the flighting segments 98 and 100, a flat, radially extending paddle 102 discharges the material fed from both directions upwardly into the tank 58 through an inlet opening 104 in the bottom thereof. Since the inlet opening 104 is located adjacent to the lower end of the mixing auger 78, the material fed into the tank will be immediately carried upwardly through the housing 66.

After the ingredients have been thoroughly intermixed in the manner previously described, the mixture is discharged from the tank through a second opening 106 in the bottom 64, the opening 106 being located adjacent to the wall 60 of the tank and communicating with an auger trough 108. As shown in FIG. 3, the opening 106 extends inwardly from the outer edge of the bottom in chordal fashion. During the mixing process, a slidable door 107 is positioned over the opening 106 to prevent material from passing therethrough. To discharge the mixture from the tank, the door 107 is pulled rearwardly by means of a handle 109, thereby permitting the mixture to fall into the trough 108. A longitudinally extending auger section 110 is selectively operable within the trough 108 to feed the material discharged through the opening 106 rearwardly to the inlet of a second, vertically extending auger section 112. The auger 112, in turn, transports the material upwardly to the inlet of a final discharge auger 114. The augers 110, 112, and 114 are driven from the power take-off shaft on the tractor through means not material to the present invention.

What we claim is:

1. Mixing apparatus, comprising: a vertical elongated mixing tank having a bottom; a vertical auger housing positioned substantially centrally within said tank, the sidewalls of said housing and said tank forming the inner and outer walls, respectively, of a material mixing chamber, said auger housing having upper and lower openings communicating with the chamber; a vertical mixing auger rotatably mounted within said housing and operable to receive material from the lower portion of said mixing chamber through the lower opening in said housing, advance the material upwardly through said housing, and discharge the material into the upper portion of said mixing chamber through the upper opening in said housing; and sweep means mounted adjacent and substantially parallel to the bottom of said tank for rotation about the vertical axis of said mixing auger, said sweep means being operable to sweep across the bottom and thereby promote mixing the material within the mixing chamber.

2. The invention defined in claim 1 wherein the bottom of said mixing tank is substantially circular, and said auger is mounted substantially concentrically therewith.

3. The invention defined in claim 2 wherein the bottom of said tank is substantially flat.

4. The invention defined in claim 1 wherein the clearance between the lower end of said auger housing and the sidewall of said tank is at least as great as that between the upper end of said housing and said tank wall.

5. The invention defined in claim 4 wherein the sidewall of said tank is substantially parallel with said auger housing, whereby the clearance between the lower end of said housing and said tank wall is substantially equal to the clearance between the upper end of said housing and said tank wall.

6. The invention defined in claim 1 wherein said sweep means is connected to said auger for rotation therewith.

7. The invention defined in claim 1 wherein the bottom of said tank is substantially flat and includes a material inlet opening located adjacent to the lower opening in said auger housing, and a material outlet opening located outwardly of the inlet opening and adjacent to the outer edge of the bottom.

8. The invention defined in claim 1 wherein the bottom of said mixing tank is substantially circular, said sweep means includes an outer end lying in close proximity to the circumference of said bottom, and including guide means extending around the outer edge of the bottom and engageable with the outer end of said sweep means for limiting vertical movement thereof.

9. The invention defined in claim 1 wherein said sweep means comprises blade means.

10. The invention defined in claim 9 wherein said blade means includes a substantially straight leading edge disposed parallel to and spaced from a line extending radially from the axis of said mixing auger.

11. The invention defined in claim 10 wherein the leading edge of said mixing blade is spaced rearwardly of said radial line relative to the direction of rotation of said blade means.

12. The invention defined in claim 9 wherein said blade means includes a sharpened leading edge formed by the intersection of an upper inclined surface and a lower inclined surface, the line of intersection of said surfaces being vertically offset from the vertical center of said blade means and the included angle between said surfaces being in the range of thirty to fifty degrees.

13. The invention defined in claim 12 wherein the included angle between said surfaces is forty degrees.

14. The invention defined in claim 12 wherein the line of intersection of said surfaces is offset downwardly from the vertical center of said blade means.

15. Mixing apparatus, comprising: a vertical mixing tank having a substantially flat bottom; a vertical tubular auger housing mounted within said tank and substantially centrally of the bottom thereof, the sidewalls of said housing and said tank forming the inner and outer walls, respectively, of a material mixing chamber, said auger housing having upper and lower openings communicating with the chamber; a vertical mixing auger rotatably mounted within said housing and operable to receive material from the lower portion of said mixing chamber through the lower opening in said housing, advance the material upwardly through said housing, and discharge the material into the upper portion of said mixing chamber through the upper opening of said housing, and radially extending sweep means connected to the lower end of said auger for rotation therewith, said sweep means being operable to sweep through the lower portion of said mixing chamber to promote mixing of material therein.

16. The invention defined in claim 15 wherein said sweep means comprises a rigid blade mounted adjacent and substantially parallel to the bottom of said tank.

17. A mobile feed mixer including a ground-wheel-supported frame and mixing apparatus, said mixing apparatus comprising: a vertically elongated cylindrical mixing tank mounted on said frame and having a substantially flat bottom; a vertical tubular auger housing mounted concentrically within said tank, the sidewalls of said housing and said tank being substantially parallel and forming the inner and outer walls, respectively, of a material mixing chamber, said auger housing having upper and lower openings communicating with the chamber; a vertical mixing auger rotatably mounted within said housing and operable to receive material from the lower portion of the mixing chamber through the lower opening said housing, advance the material upwardly through said housing, and discharge the material into the mixing chamber through the upper opening in said housing; and blade means mounted adjacent and substantially parallel to the buttom of said tank for rotation about the vertical axis of said auger, said blade means being operable to sweep through the lower portion of said mixing chamber and thereby promote mixing of material therein.

18. Mixing apparatus, comprising: a vertical mixing tank; a vertical auger housing positioned substantially centrally within said tank, the sidewalls of said housing and said tank forming the inner and outer walls, respectively, of a material mixing chamber, said auger housing having upper and lower openings communicating with the chamber; a vertical mixing auger rotatably mounted within said housing and operable to receive material from the lower portion of said mixing chamber through the lower opening in said housing, advance the material upwardly through said housing, and discharge the material into the upper portion of said mixing chamber through the upper opening in said housing; said mixing tank having a substantially flat bottom with a material outlet opening located adjacent to the outer edge thereof; and sweep means mounted adjacent and substantially parallel to the bottom of said tank for rotation about the vertical axis of said mixing auger, said sweep means extending outwardly from the lower end of the housing auger to the outer edge of the tank bottom and operable to sweep across the material outlet opening therein.

19. The invention defined in claim 18 wherein the bottom of said mixing tank is substantially circular, and the material outlet opening extends inwardly from the outer edge of the bottom in chordal fashion.

20. The invention defined in claim 19 including a removable cover on the discharge opening in said tank bottom, and a discharge conveyor mounted beneath the discharge opening and operable, when the cover is removed, to receive the material discharged through the opening.

21. Mixing apparatus comprising: a vertical mixing tank; a vertical auger housing positioned substantially centrally within said tank, the sidewalls of said housing and said tank forming the inner and outer walls, respectively, of a material mixing chamber, said auger housing having upper and lower openings communicating with the chamber; a vertical mixing auger rotatably mounted within said housing and operable to receive material form the lower portion of said mixing chamber through the lower opening in said housing, advance the material upwardly through said housing, and discharge the material into the upper portion of said mixing chamber through the upper opening in said housing; and a material lifting blade mounted adjacent and substantially parallel to the bottom of said tank for rotation about the vertical axis of said mixing auger, said lifting blade extending outwardly from the lower end of said mixing auger to the sidewall of said tank and operable to sweep across the bottom of said tank, thereby repeatedly lifting the material contained in the mixing chamber adjacent the sidewall of the tank and causing it to gradually shift inwardly toward the lower end of said mixing auger.

22. The invention defined in claim 21 wherein said lifting blade includes a leading surface inclined upwardly and rearwardly relative to its direction of travel.

References Cited

UNITED STATES PATENTS

| | | | |
|---|---|---|---|
| 2,896,923 | 7/1959 | Luscombe | 259—97 |
| 3,185,449 | 5/1965 | Kasten | 259—97 |
| 3,318,582 | 5/1967 | Fisher | 259—8 |

ROBERT W. JENKINS, Primary Examiner

U.S. Cl. X.R.

259—97